(12) United States Patent
Hettler et al.

(10) Patent No.: US 9,069,107 B2
(45) Date of Patent: Jun. 30, 2015

(54) ROD LENS AND METHODS FOR PRODUCING SAME

(71) Applicant: Schott AG, Mainz (DE)

(72) Inventors: Robert Hettler, Kumhause (DE); Frank Gindele, Schweitenkirchen (DE); Edgar Pawlowski, Stadecken-Elsheim (DE)

(73) Assignee: SCHOTT AG, Mainz (DE)

( * ) Notice: Subject to any disclaimer, the term of this patent is extended or adjusted under 35 U.S.C. 154(b) by 11 days.

(21) Appl. No.: 13/940,333

(22) Filed: Jul. 12, 2013

(65) Prior Publication Data

US 2014/0016206 A1 Jan. 16, 2014

(30) Foreign Application Priority Data

Jul. 12, 2012 (DE) .......................... 10 2012 106 289

(51) Int. Cl.
*G02B 27/10* (2006.01)
*G02B 3/00* (2006.01)

(52) U.S. Cl.
CPC ................ *G02B 3/0018* (2013.01); *G02B 3/00* (2013.01); *G02B 3/0068* (2013.01); *G02B 3/0087* (2013.01)

(58) Field of Classification Search
USPC .......................... 359/619, 900, 620, 621, 622
See application file for complete search history.

(56) References Cited

U.S. PATENT DOCUMENTS

| | | |
|---|---|---|
| 5,457,576 A | 10/1995 | Atkinson et al. |
| 5,593,621 A | 1/1997 | Koike et al. |
| 2006/0082895 A1 | 4/2006 | Inoue et al. |
| 2010/0327470 A1 | 12/2010 | Protte et al. |

FOREIGN PATENT DOCUMENTS

| | | |
|---|---|---|
| EP | 1045453 | 10/2000 |
| JP | S6224450 A | 2/1987 |
| JP | 1995146435 A | 6/1995 |
| JP | 2006106324 A | 4/2006 |
| WO | 9404949 A1 | 3/1994 |

OTHER PUBLICATIONS

Office Action (with English Translation) dated Jun. 3, 2013 in corresponding German Application No. 10 2012 106 289.7, 7 pp.
Japanese Office Action dated Jun. 3, 2014 corresponding to Japanese Patent App. No. 2013-145964, 6 pp.

*Primary Examiner* — Jack Dinh
(74) *Attorney, Agent, or Firm* — Ohlandt, Greeley, Ruggiero & Perle, LLP (57) ABSTRACT

A rod lens and methods for producing such a rod lens are disclosed. The rod lens and methods include a sealing glass and holder glass or a metallic holder that are heated so that only the sealing glass melts and forms a spherical cap to define a lens element joined to a light guiding element. A plurality of rod lenses may form an array arrangement.

21 Claims, 9 Drawing Sheets

ROD LENS AND METHODS FOR PRODUCING SAME

CROSS REFERENCE TO RELATED APPLICATIONS

This application claims benefit under 35 U.S.C. §119(a) of German Patent Application No. 10 2012 106 289.7, filed Jul. 12, 2012, the entire contents of which are incorporated herein by reference.

BACKGROUND OF THE INVENTION

1. Field of the Invention

The invention relates to a method for producing rod lenses each of which includes a light guiding element and a lens element, and also relates to such a rod lens, and to an array arrangement of such rod lenses.

2. Description of Related Art

Rod lenses have been known and comprise an elongated light guiding element and a lens element on at least one end of the light guiding element. Such rod lenses have been produced from glass blocks or preforms by grinding and polishing, or by melting such preforms in a mold and deforming them by compression. Manufacturing thereof in a molding process is also known (US 2010/327470 A).

The prior art methods suffer from quite high production costs. Moreover, the known methods are not suitable for producing a housing such as it is required for many applications of the rod lens at the same time when producing the rod lens.

SUMMARY

Therefore, an object of the invention is to provide an improved method for producing rod lenses. While producing the rod lens it should be possible at the same time to provide a housing or parts of a housing therefor, such as it is required in various applications of rod lenses. What is to be achieved in this way is a low loss light guiding means in terms of focusing, collimation, or imaging, in solar cells, photodetectors, CCD and CMOS sensors, LEDs, OLEDs, fibers and lasers.

Specifically, a glass body made of sealing glass and having a comparatively low melting temperature and a predefined coefficient of thermal expansion is supported by a holder that has a higher melting temperature than the sealing glass but a similar thermal expansion coefficient as the sealing glass. While being supported the sealing glass is caused melt, whereby a portion of the sealing glass body projecting from the holder into air or gas deforms into a body having a spherical or nearly spherical surface, due to the effects of surface tension at a free surface and interfacial tension at an edge of for example a housing part or at the end face of the holder. Depending on the size of the projecting portion of the sealing glass body above the holder, the curvature will be more or less pronounced, that is to say the spherical cap which is formed will comprise more or less large portions of a ball or ball-shaped body.

The spherical surface formed by surface tension effects is fire polished and thus of high quality. The surface tension effects and interfacial tensions depend on material properties of the glass, the atmosphere used, and/or on the metal surface in case of a metallic holder. For example, while producing a rod lens the interfacial tension of liquid sealing glass may be influenced for shaping the rod lens by subjecting the liquid sealing glass to an atmosphere of a gas composition suitable to influence the surface tension of the liquid sealing glass. The surface tension also depends on the temperature of the atmosphere. In this manner, the surface tension may be increased or decreased. The higher the surface tension, the more spheroidal will be the produced cap. Generally, the gas for influencing the surface tension is added to the atmosphere which is determined for example by manufacturing conditions, in particular in a furnace.

The sealing glass body forming the lens element is supported by a glass or metallic holder. The lens element of sealing glass may simply bear upon a glass body of "holding glass" that has a higher melting temperature than the sealing glass, or may be enclosed by an annular shape of the holding glass. To avoid mechanical stresses in the rod lens, the thermal expansion coefficients of the sealing glass and the holding glass should not differ considerably. This also applies when an annular metallic holder is used, unless the holder is flexible because of an extremely thin metal thickness. Preferred wall thicknesses for this purpose are smaller than 100 µm (micrometers). When the expansion coefficient of the glass is greater than that of the metallic holder, an air gap will form between the metallic holder and the glass when being cooled. This is of advantage for optical total reflection at the interface of the glass. For this purpose, metallic holders of a small wall thickness should be used, or the sealing glass and the holder should only be joined at an elevated temperature.

The glass or metallic holder used in producing the rod lens becomes a portion of a housing or forms a housing of the rod lens after manufacturing. A hermetically sealed package of the rod lens is achieved, which is particularly important when the rod lens is coupled to an active optical device such as an LED, a laser, or a photodetector. This package allows for low loss light guiding in light focusing, collimation, and imaging operations.

The geometric shape of the rod lens includes prismatic or cylindrical shapes of a constant rod cross-section, as well as pyramidal or conical shapes with tapering cross-sections of the light guiding element. It will be understood that with prismatic and pyramidal shapes only approximately spherical surfaces of the lens element can be achieved. Array arrangements of such angular shaped rod lenses may achieve a better use of surface area than circular cylindrical rod lenses.

In case a sufficient total reflection at the lateral surfaces of the light guiding element cannot be anticipated, it is likewise possible to use polished inner surfaces of high reflectance which function as a mirror or which are provided with a coating to increase light guiding performance.

For influencing the light guiding performance it is also possible to exploit different refractive indices of the employed glasses. The holding glass could have a lower refractive index than the sealing glass in order to achieve light guiding properties.

By using glasses of different refractive indices, gradient-index lens effects may be obtained. For this purpose, sealing glass of a refractive index n1 may be used in a core zone, and of a refractive index n2 in a cladding region, along with holding glass of a refractive index n3.

Further details of the invention will be apparent from the description of the following exemplary embodiments and from the appendant claims.

DETAILED DESCRIPTION

Figure 1:
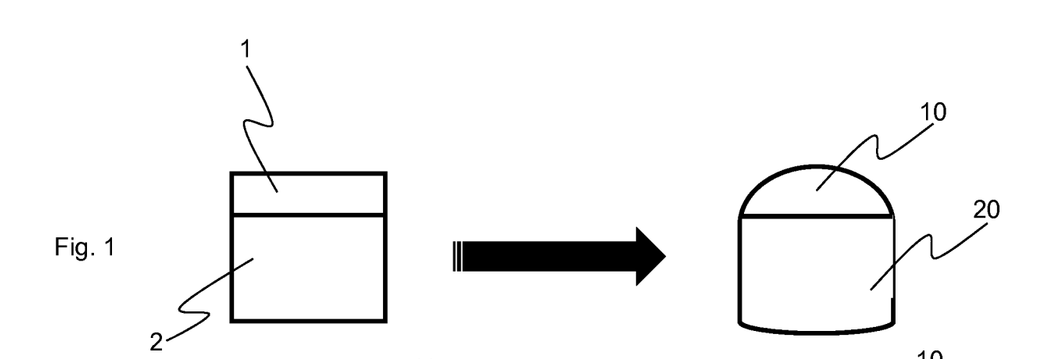
FIG. 1 illustrates the manufacturing of a rod lens from two different types of glass.

FIG. 1 schematically shows a first embodiment of the method for producing rod lenses. A sealing glass 1 is provided having a comparatively low melting temperature $T_{g1}$ and a predefined coefficient of thermal expansion $C_{TE1}$ and a solid glass body made of a holder glass 2 that has a higher melting temperature $T_{g2}$ than the sealing glass and a coefficient of thermal expansion $C_{TE2}$ close to the thermal expansion coefficient of the sealing glass.

The terms "close to" or "similar" in conjunction with thermal expansion coefficient $T_o$ relative to $T_{g2}$ or relative to $T_{g3}$ are intended to mean that the thermal expansion in the bodies of sealing glass 1 and holder glass 2 or holder metal 3, with the practical rod lens diameters ranging from 1 to 10 mm, do not lead to such distortions in the glass of the produced rod lenses which would have to be regarded as unacceptable.

The glass body of holder glass 2 forms a holder or support for the glass body of sealing glass 1. The glass bodies from glasses 1 and 2 are joined by being stacked one above the other, however, a stronger joint between the two bodies of glasses 1 and 2 at the start of the method is preferred. By applying a temperature higher than the melting temperature $T_{g1}$ of sealing glass 1 but lower than the melting temperature $T_{g2}$ of holder glass 2, the sealing glass 1 is caused to melt, and the effects of surface tension and interfacial tension cause the molten glass 1 at the free surface in air or gas to deform into a spherical cap, when assuming a circular cylindrical glass body of holder glass 2. In case the glass body 2 is of prismatic shape, the cap which is formed will have an approximately spherical surface. The cap constitutes a lens element 10, and the glass body 2 constitutes a light guiding element 20 of the rod lens.

Figure 2:
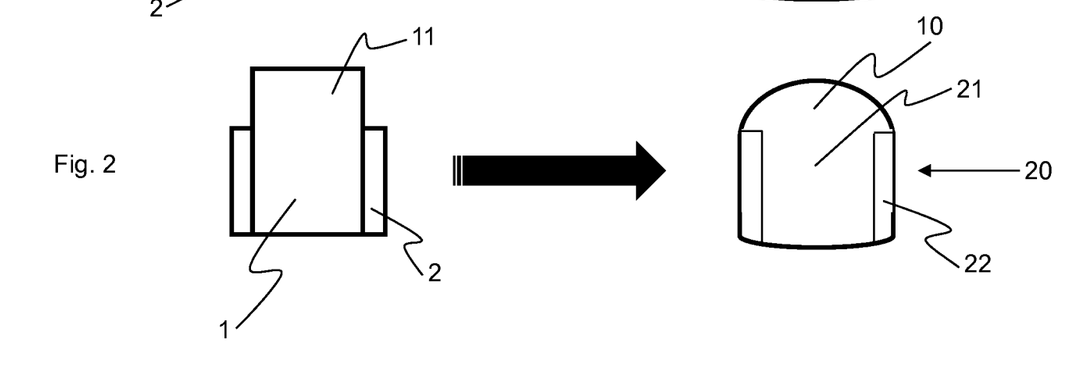
FIG. 2 illustrates another way of producing rod lenses from different types of glass.

FIG. 2 shows another embodiment of producing a rod lens. The sealing glass 1 is enclosed by a holder glass 2 of annular shape, with a portion 11 of the body of sealing glass 1 projecting upwards beyond the annular holder glass 2. When the sealing glass body is caused to melt, the glass of portion 11 projecting from the annular ring will flow over the upper edge of the annular ring and will form a cap, due to the surface tension and interfacial tension of the liquid glass. In this way, a lens element 10 of sealing glass and a light guiding element 20 having a core 21 of sealing glass 1 and a cladding 22 of holder glass 2 will be formed.

Figure 3:
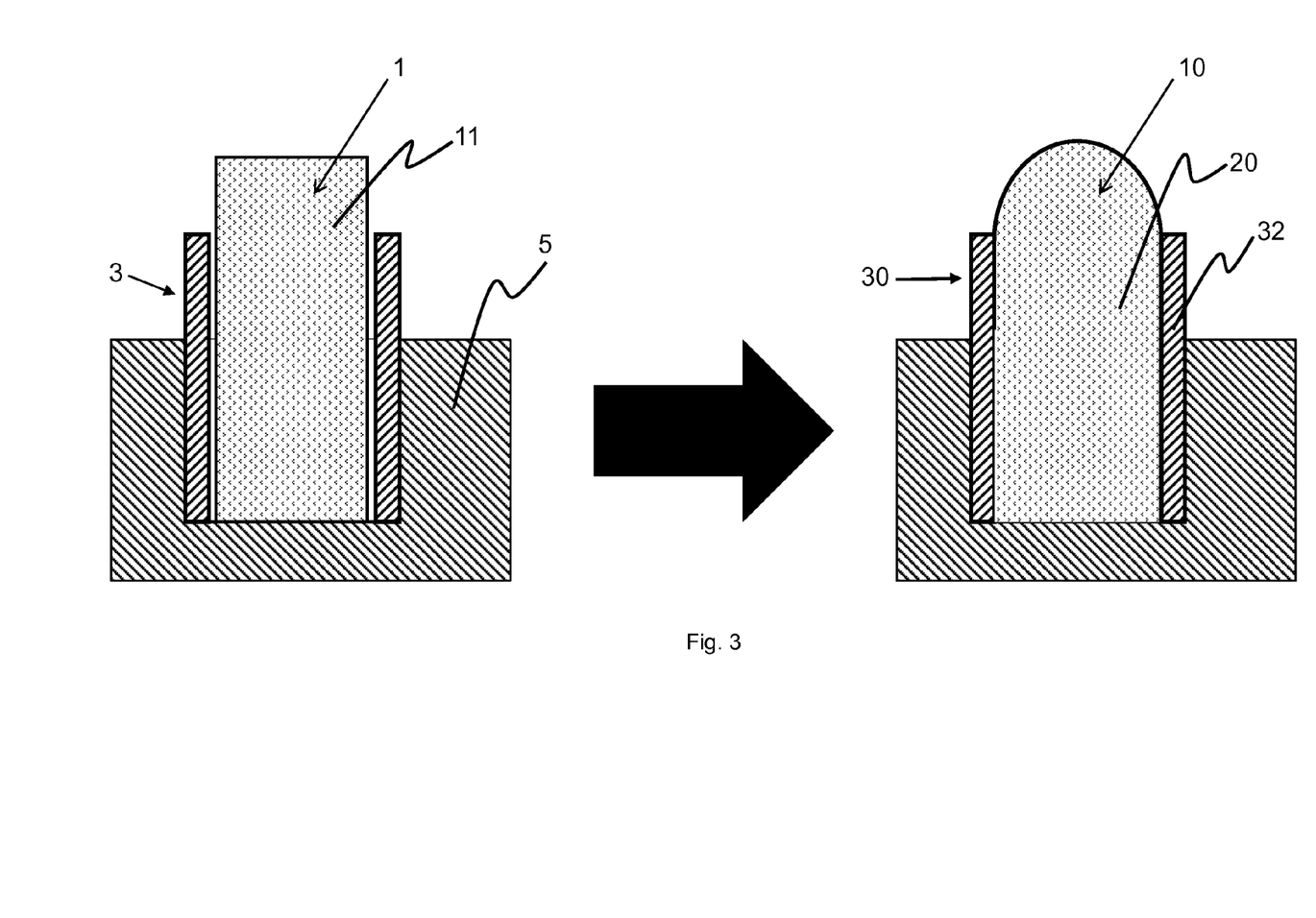
FIG. 3 illustrates the manufacturing of a rod lens using a glass and a metallic holder.

FIG. 3 shows the method of FIG. 2, but with a holder 3 made of metal whose thermal expansion coefficient $C_{TE3}$ is similar to that of the sealing glass 1. Holder 3 in form of a short tubular portion is inserted into a crucible 5, and the body of the sealing glass 1 bears upon the flat bottom of the crucible, while a portion 11 of the body of sealing glass 1 protrudes from holder 3. A spacing may exist between holder 3 and sealing glass 1. When the temperature is raised above the melting temperature $T_{g1}$ of the sealing glass 1, sealing glass 1 will liquefy and the spacing to holder 3 will close, while portion 11 of the sealing glass body will deform into a spherical cap which constitutes the lens element 10 of the rod lens. The light guiding element 20 is defined by the remaining portion 21 of the sealing glass body. In this embodiment, holder 3 forms a housing 30 of light guide 20.

Figure 4:
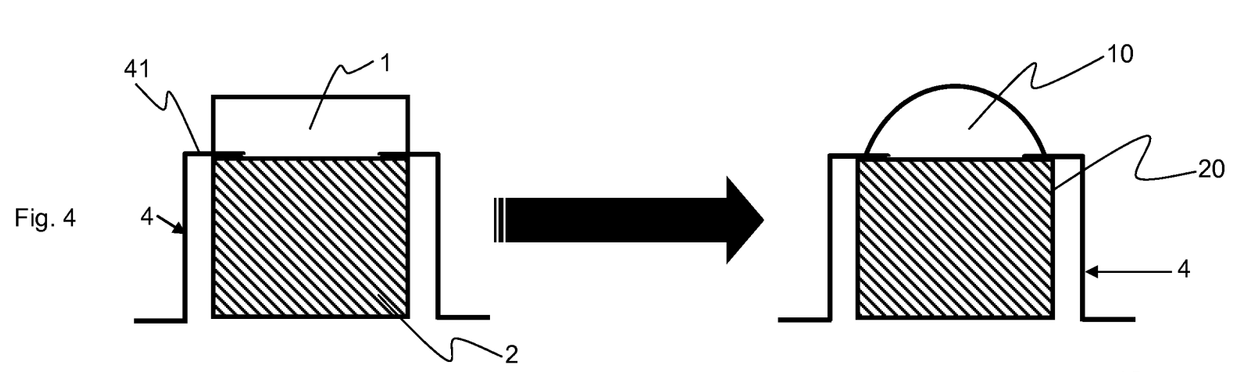
FIG. 4 illustrates the manufacturing of rod lenses including a light guiding element and a lens element of different types of glass and using a partially metallic holder.

FIG. 4 shows the manufacturing of a rod lens with a cover 4 as a housing. The body of sealing glass 1 and the glass body of holder glass 2 clamp radial projections 41 of the cover 4, which projections are fused into the interface between sealing glass 1 and holder glass 2 when the sealing glass 1 melts, and so are firmly anchored.

While the body of sealing glass 1 melts, lens element 10 is formed as a spherical cap, and light guiding element 20 is formed as a portion of a circular cylinder or a prism, depending on the geometry of the glass body of holder glass 2. Cover 4 forms the housing of the rod lens.

Figure 5:
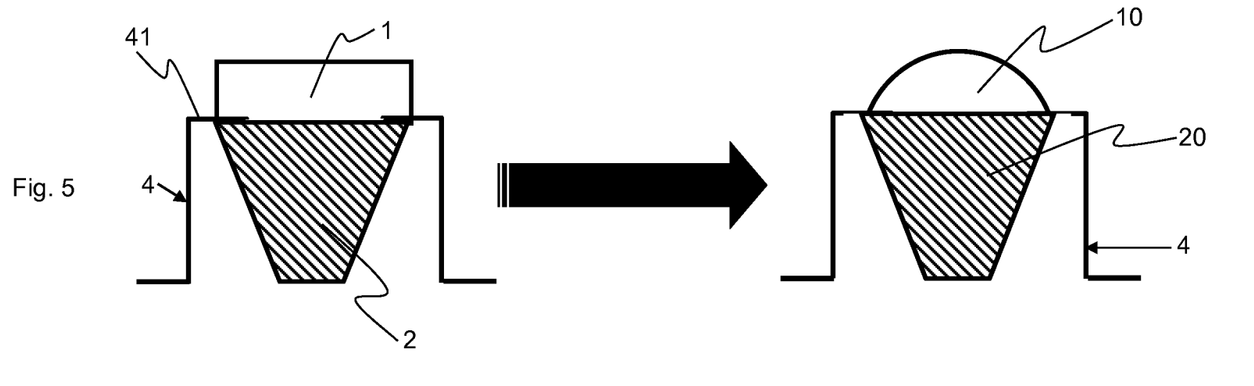
FIG. 5 illustrates the manufacturing of a modified rod lens including a tapering light guiding element.

FIG. 5 shows a modification of the method of FIG. 4. Holder glass 2 has a shape of a truncated cone or a truncated pyramid, with the smaller base surface at the lower end. In this manner, a focusing effect is imparted to the light guiding element 20. Cover 4 again forms the housing of the rod lens.

In FIG. 5, as in FIG. 4, a light transmitting face facing lens element 10 is formed, and a light transmitting face facing away from lens element 10, which in the case of FIG. 5 is smaller than the light transmitting face facing the lens element.

Figure 6:
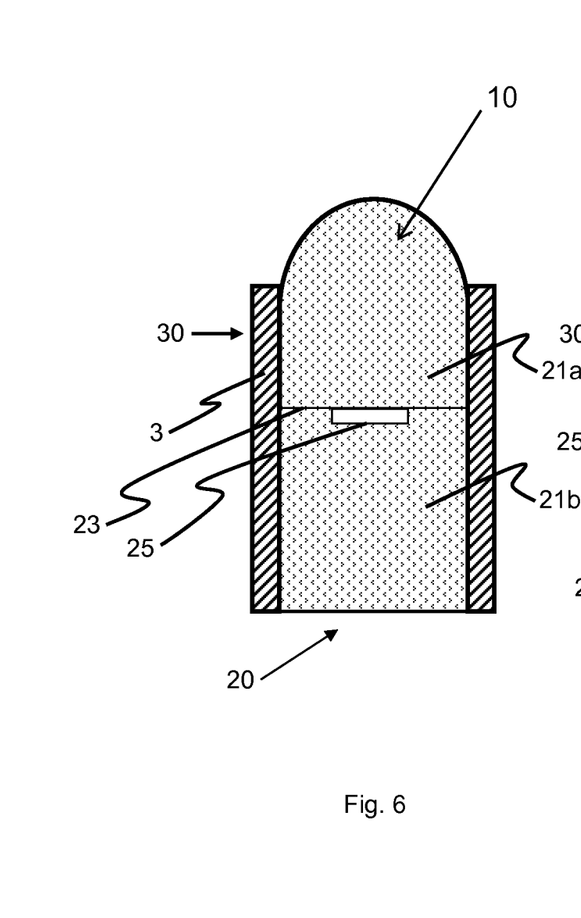
FIG. 6 shows a rod lens with a metallic holder and a sealing glass body consisting of two partial bodies.

FIG. 6 shows a rod lens having a spherical cap as a lens element 10, and a light guiding element 20 which is composed of two sealing glass bodies, 21a and 21b. A light active or light passive substance 25 may be enclosed in joint 23, which may for example constitute a filter. The filter may alter spectral transmittance. Light guiding element 20 may have a circular cylindrical geometric shape, however, prismatic shapes having a square or hexagonal or octagonal cross-section, for example, are likewise possible. In such a case, the surface of the cap will only be approximately spherical, the light-collecting property is however retained. Light guiding element 20 is enclosed by a housing 30.

Figure 7:
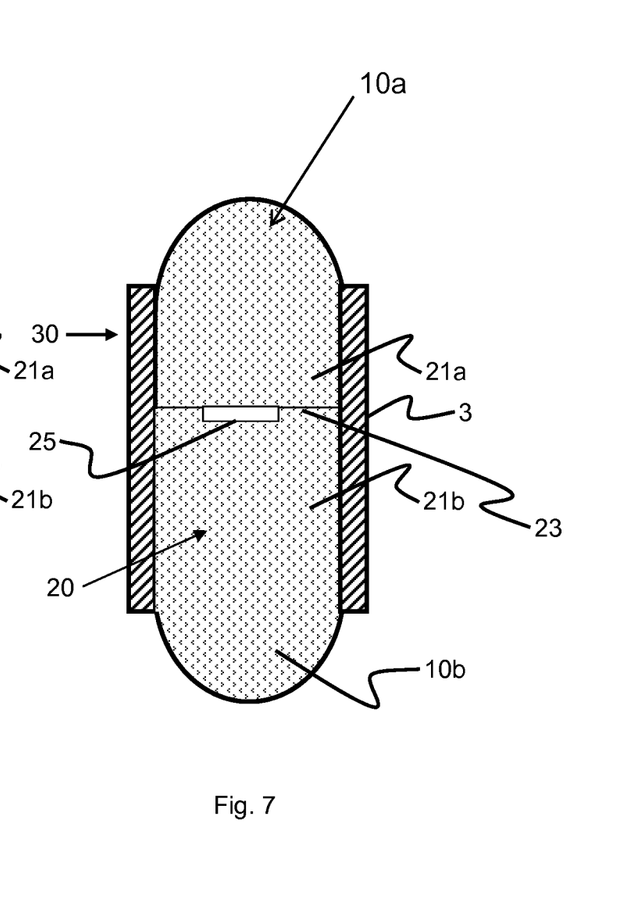
FIG. 7 shows a modification of the embodiment shown in FIG. 6.

FIG. 7 shows an embodiment of the rod lens with a respective lens element 10a, 10b at either end of the rod lens. Such a rod lens may be produced by supporting the sealing glass body clamped in the holder when heated to above the melting temperature thereof, so that a spherical cap is formed at the free surface of the rod lens from a projecting lower portion of the sealing glass. A light active or light passive substance 25 may be enclosed in the joint 23, which may for example constitute a filter. The filter may alter spectral transmittance.

Figure 8:
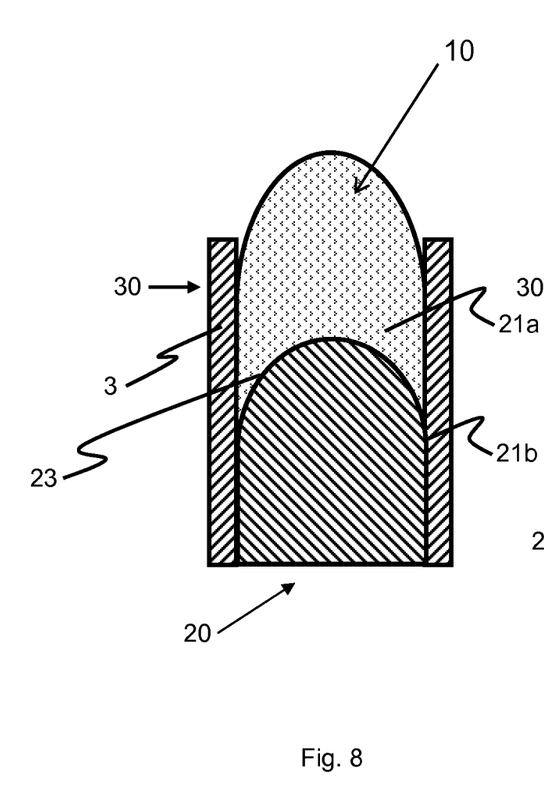
FIG. 8 shows a rod lens with a metallic holder and a sealing glass body consisting of two partial bodies each having a convex surface shape.

FIG. 8 shows a rod lens including a spherical cap as a lens element 10 and a light guiding element 20 which is composed of two sealing glass bodies, 21a and 21b. Sealing glass body 21b is produced in a first manufacturing step, and sealing glass body 21a in a second manufacturing step. The glasses of bodies 21a, 21b have different thermal properties (softening temperature) and optical properties (refractive index, Abbe number). Due to the different dispersion of the glasses, an optical element with achromatic properties is produced. The geometric shape of light guiding element 20 may be that of a circular cylinder, however, prismatic shapes are likewise possible, for example with a square or hexagonal or octagonal cross-section. In such a case, the surface of the cap will only be approximately spherical, the light-collecting property is however retained. Light guiding element 20 is enclosed by a housing 30.

Figure 9:
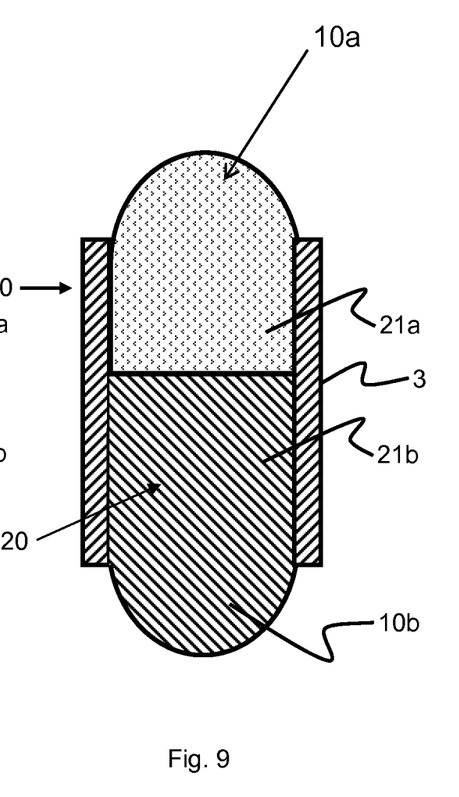
FIG. 9 shows a modification of the embodiment shown in FIG. 8.

FIG. 9 shows an embodiment of the rod lens with a respective lens element 10a, 10b at either end of the rod lens. Lens elements 10a, 10b are made of glasses having different thermal and optical properties similar to those described with reference to FIG. 8. Such a rod lens may be produced by supporting the respective sealing glass body clamped in the holder when being heated to above the melting temperature thereof, so that a spherical cap is also formed from a projecting lower portion of the sealing glass at the free surface of the rod lens.

Figure 10:
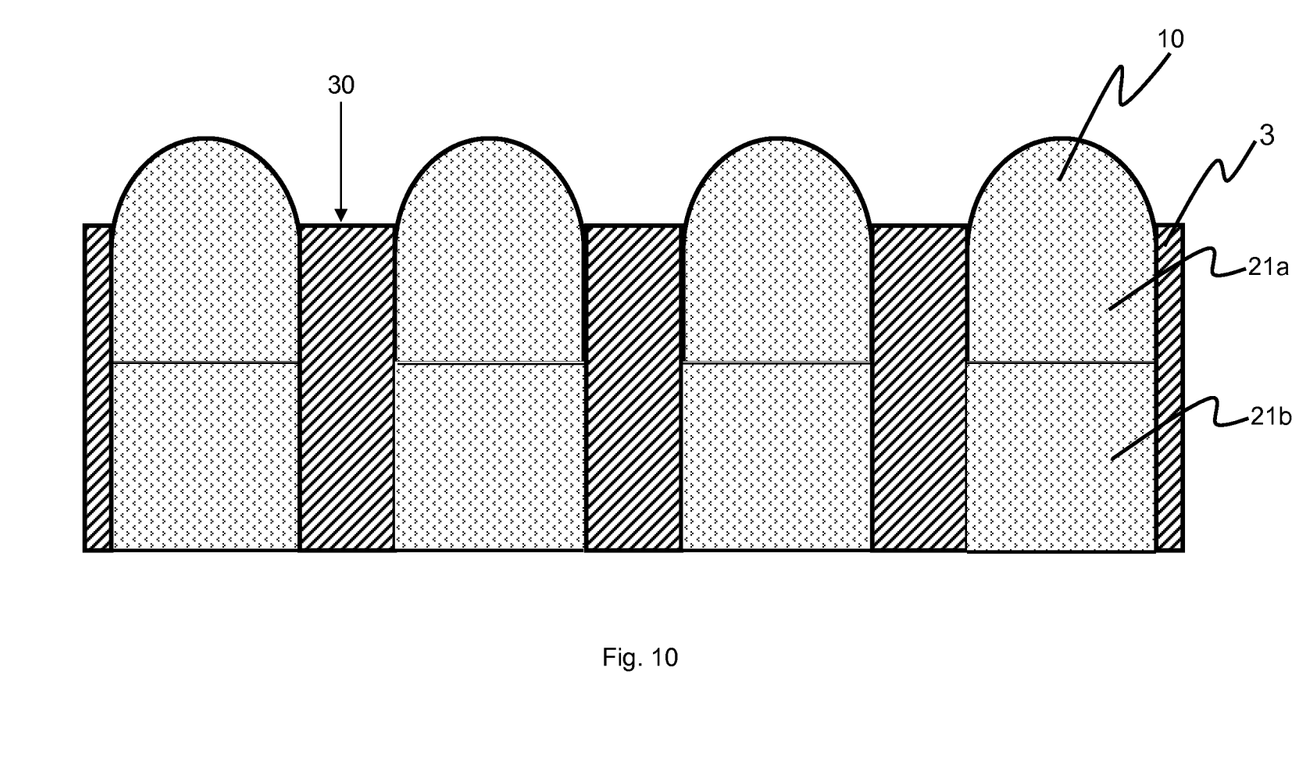
FIG. 10 illustrates an array arrangement of rod lenses.

FIG. 10 shows an array arrangement of rod lenses. Sealing glass 1 forms the lens element 10 and also the light guiding element 20 of each rod lens. The holder encloses the rod lenses, thus forming a common housing 30 for all of the rod lenses in the array.

Figure 11:
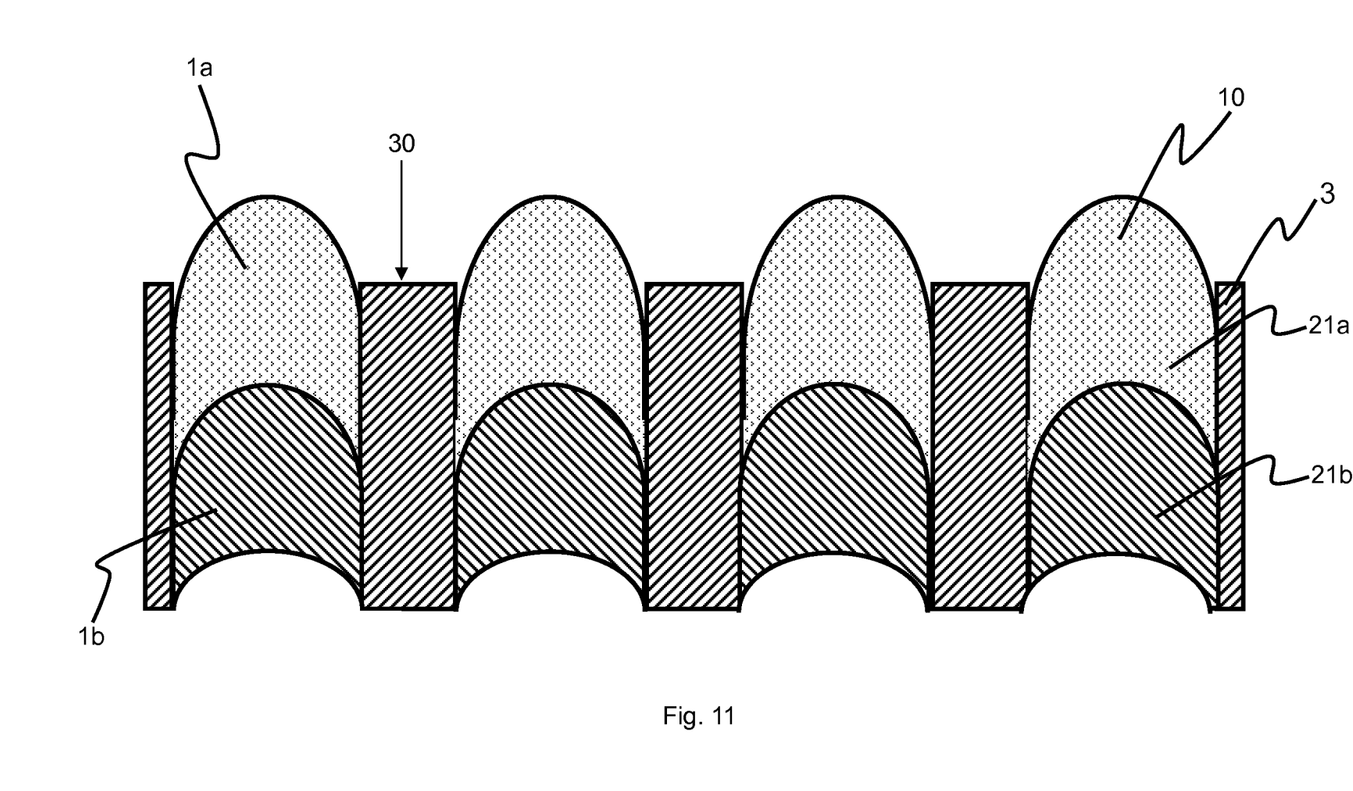
FIG. 11 illustrates an array arrangement of rod lenses with a metallic holder and two concave-convex glass bodies of different optical properties.

FIG. 11 shows an array arrangement of rod lenses similar to those of FIG. 8. Sealing glass 1a forms the lens element 10 and at the same time a portion 21a of the light guiding element 20 of each individual rod lens, the other portion 21b thereof being formed by sealing glass 1b. Glasses 1a, 1b have different thermal properties (softening temperature) and optical properties (refractive index, dispersion, partial dispersion, group delay dispersion).

Due to the different dispersion of the glasses, an optical element with achromatic properties is produced. Metallic holder 3 encloses the rod lenses, thus forming a common housing 30 for all of the rod lenses in the array.

Figure 12:
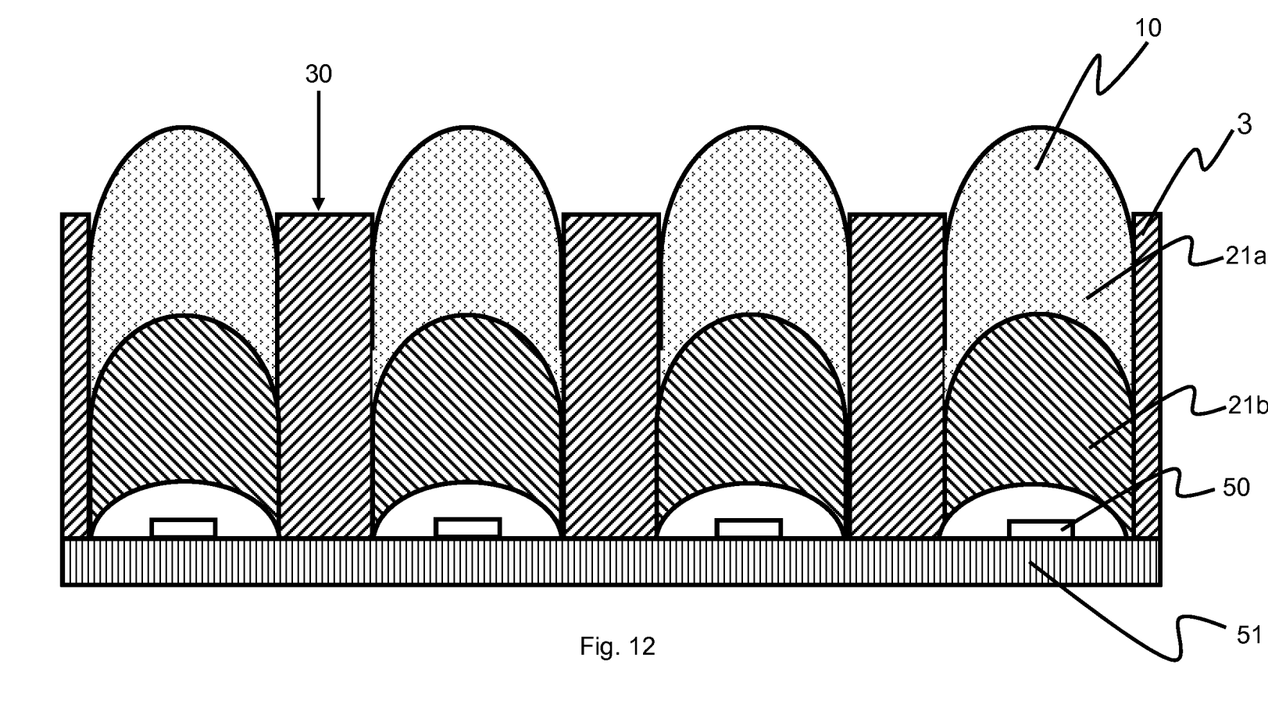
FIG. 12 shows the array arrangement of rod lenses of FIG. 11 bonded to a wafer with solar cells, photodetectors, CCD or CMOS sensors, LEDs, or lasers.

FIG. 12 shows a further development of the array arrangement of rod lenses shown in FIG. 11. The array arrangement of rod lenses with a metallic holder 3 and two concave-convex glass bodies with different optical properties is bonded to a wafer 51 that includes active optical devices 50, which may include solar cells, photodetectors, CCD or CMOS sensors, LEDs, or lasers.

Figure 13:
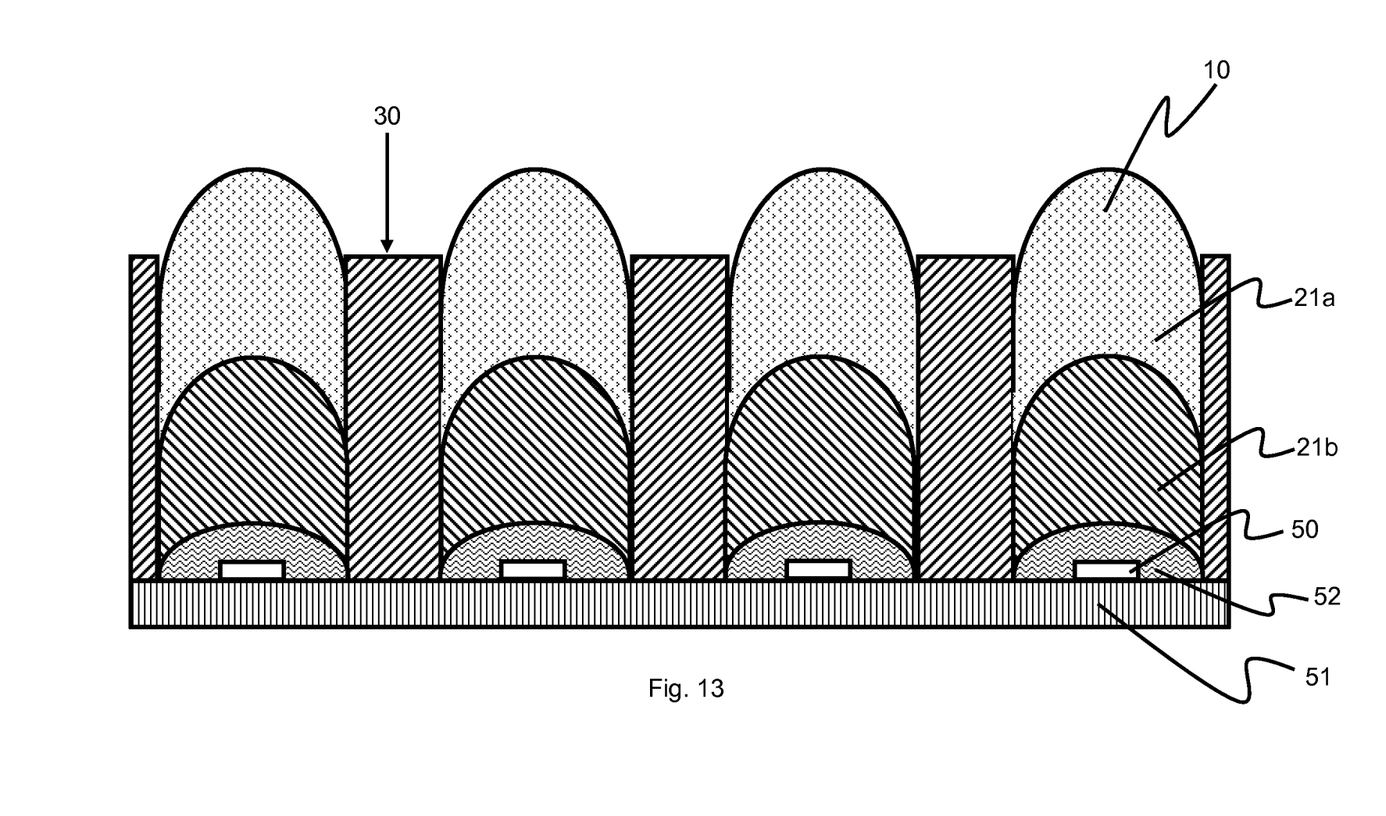
FIG. 13 shows an array arrangement of rod lenses similar to that of FIG. 12, but with the space between the optical element and the active device filled with a polymer, a glass, a liquid, and/or a composite.

FIG. 13 shows another array arrangement of rod lenses according to the pattern of FIG. 12. The spacing between the optical element and the active device 50 is filled with a polymer, a glass, a liquid, or a composite.

The described method for producing rod lenses permits to produce spherical caps of different heights (in relation to the sphere radius). The portion 11 of the sealing glass body protruding from the holder is formed to protrude more or less, so that the spherical cap formed upon melting will be smaller or higher as compared to the radius of the sphere of which the cap forms a part.

Depending on the application of the rod lens, it is possible to exploit the inner surfaces of high reflectivity, which function as a mirror, to increase the light guiding performance, or which are provided with a coating in order to avoid light losses. By coating or pretreating the surface it can be achieved that the inner surface of the annular holder is not wetted with glass. For example, the material for influencing interfacial tension may be deposited by PVD, sputtering, sol-gel coating, and/or CVD. The material for influencing interfacial tension may also be provided by gas flushing the holder and the glass, by plasma oxidation, and/or by immersing the substrate into a liquid, with the gas or the liquid containing the component for influencing the interfacial tension. Due to the little difference between the thermal expansion coefficients of the sealing glass and the holder, distortions in the glass bodies during operation of the rod lenses are largely avoided. If the thickness of the holder is extremely small, greater differences of the thermal expansion coefficients of the sealing glass and the holder may be tolerated. Advantageous for this purpose are wall thicknesses of less than 100 µm.

The preferably optical glass may for example include at least one glass selected from a group comprising fluorophosphate glasses, fluor crown glasses, phosphor crown glasses, phosphorus heavy crown glasses, boron crown glasses, barium light crown glasses, crown glasses, zinc crown glasses, barium crown glasses, heavy crown glasses, crown-flint glasses, barium light flint glasses, double heavy crown glasses, lanthanum crown glasses, double light flint glasses, barium flint glasses, light flint glasses, flint glasses, barium heavy flint glasses, lanthanum flint glasses, lanthanum heavy flint glasses, heavy flint glasses, low crown glasses, low flint glasses, long crown special glasses, low heavy flint glasses, short flint glasses, short flint special glasses. The aforementioned glasses are to be understood as examples only, and the invention is not limited to this selection.

EXAMPLE 1

Possible composition of glasses for a rod lens according to FIG. 1 or 2:
Sealing glass 8250 from Schott AG, in percent by weight:

| | |
|---|---|
| $SiO_2$ | 69.2 |
| $B_2O_3$ | 18.5 |
| $Al_2O_3$ | 2.6 |
| $Li_2O$ | 0.6 |
| $K_2O$ | 7.7 |
| $ZnO$ | 0.6 |
| $As_2O_3$ | 0.05 |

Holder glass 8330 from Schott AG, in percent by weight:

| | |
|---|---|
| $SiO_2$ | 80.6 |
| $B_2O_3$ | 12.8 |
| $Al_2O_3$ | 2.3 |
| $Li_2O$ | 0.6 |
| $K_2O$ | 0.7 |

EXAMPLE 2

Possible composition of rod lens materials according to FIG. 3:
Metal sheath material: Fe—Ni—Co
Composition in percent by weight:

| | |
|---|---|
| Ni | 29 |
| Co | 17 |
| C | 0.01 |
| Fe | 53.99 |

Sealing glass 8250 from Schott AG, in percent by weight:

| | |
|---|---|
| $SiO_2$ | 69.2 |
| $B_2O_3$ | 18.5 |
| $Al_2O_3$ | 2.6 |
| $Li_2O$ | 0.6 |
| $K_2O$ | 7.7 |
| $ZnO$ | 0.6 |
| $As_2O_3$ | 0.05 |

What is claimed is:

1. A method for producing a rod lens having a light guiding element and a lens element, comprising the steps of:
   providing a glass body made of a sealing glass having a sealing glass melting temperature ($T_{g1}$) and a sealing glass thermal expansion coefficient ($C_{TE1}$);
   providing a holder made of a material selected from the group consisting of holder glass, ceramic, glass ceramic, and metal, the material having a holder melting temperature ($T_{g2}$, $T_{melt3}$) that is higher than the sealing glass melting temperature ($T_{g1}$), and having a holder thermal expansion coefficient ($C_{TE2}$) either close to the sealing glass thermal expansion coefficient ($C_{TE1}$), or in case of a metallic holder a thermal expansion coefficient ($C_{TE3}$) different from the sealing glass thermal expansion coefficient ($C_{TE1}$);
   combining the glass body of the sealing glass with the holder to ensure some mechanical support of the glass body by the holder, with at least a portion of the glass body projecting beyond the holder;
   melting the glass body at a temperature such that the portion of the glass body projecting beyond the holder is deformed into a cap having a spherical surface, while the holder remains dimensionally stable to produce the rod lens; and
   allowing the rod lens to cool down.

2. The method as claimed in claim 1, wherein the holder comprises a solid glass holder, further comprising the step of joining the solid glass holder to the glass body of the sealing glass.

3. The method as claimed in claim 1, wherein the holder or a part of the holder comprises an annular glass or metallic holder.

4. The method as claimed in claim 1, wherein the holder encloses at least two partial bodies of sealing glass.

5. The method as claimed in claim 1, further comprising a light-active substance enclosed by the holder.

6. The method as claimed in claim 1, further comprising a metallic cover anchored in glass.

7. A rod lens comprising:
   a holder made of a material selected from the group consisting of holder glass, ceramic, glass ceramic, and metal; and
   a melted lens element made of sealing glass having a sealing glass melting temperature ($T_{g1}$) and a sealing glass thermal expansion coefficient ($C_{TE1}$), and having a spherical or nearly spherical surface extending from the holder, wherein the holder has a holder melting temperature that is higher than the sealing glass melting temperature, but the holder having a holder thermal expansion coefficient similar to the sealing glass thermal expansion coefficient ($C_{TE1}$), or in case of a metallic holder, a thermal expansion coefficient ($C_{TE3}$) different from then the sealing glass thermal expansion coefficient ($C_{TE1}$).

8. The rod lens as claimed in claim 7, wherein the holder comprises a holder glass body having a shape selected from the group consisting of a circular cylindrical shape, a prismatic shape, a conical shape, and a pyramidal shape, the holder glass body having a first light transmitting face that faces the lens element, and a second light transmitting face that faces away from the lens element.

9. The rod lens as claimed in claim 7, wherein the holder comprises an annular socket for the melted lens element.

10. The rod lens as claimed in claim 7, wherein the melted lens element comprises at least two partial bodies.

11. The rod lens as claimed in claim 7, wherein the melted lens element consists of at least two sealing glasses having different optical properties selected from the group consisting of refractive index, dispersion, partial dispersion, group delay dispersion, and combinations thereof.

12. The rod lens as claimed in claim 7, further comprising an intermediate layer of a light-active substance that is enclosed between the melted lens element and an adjacent glass body.

13. The rod lens as claimed in claim 8, wherein the holder comprises a cover which is anchored between the melted lens element and the holder glass body.

14. The rod lens as claimed in claim 7, wherein the holder is at least partially made of metal.

15. The rod lens as claimed in claim 14, wherein the holder comprises a coating or surface-treatment, the coating or surface-treatment adjusting a property selected from the group consisting of surface tension, interfacial tension to the sealing glass, and combinations thereof.

16. The rod lens as claimed in claim 14, wherein the holder comprises a reflectance adjusting coating or surface-treatment.

17. The rod lens as claimed in claim 14, wherein the holder has a wall thickness of less than 100 μm.

18. An array arrangement of rod lenses as claimed in claim 7.

19. The array arrangement of rod lenses as claimed in claim 18, said array arrangement being bonded to a wafer selected from the group consisting of solar cells, photodetectors, CCD or CMOS sensors, LEDs, and lasers.

20. The array arrangement of rod lenses as claimed in claim 19, wherein the array arrangement comprises a common housing, which forms a hermetically sealed joint with the wafer.

21. The array arrangement of rod lenses as claimed in claim 19, further comprising a filling selected from the group consisting of polymer, glass, liquid, a composite, and any combinations thereof, the filling filling spacings next to the solar cells, photodetectors, CCD or CMOS sensors, LEDs, or lasers.

* * * * *